May 7, 1940.  W. L. McGRATH ET AL  2,199,505

ENGINE STARTER GEARING

Filed Jan. 20, 1938

Elastic material

Witness:
Burr W. Jones

INVENTOR.
William L. McGrath
BY Maurice P. Whitney
Clinton A. James
ATTORNEY.

Patented May 7, 1940

2,199,505

UNITED STATES PATENT OFFICE 2,199,505

ENGINE STARTER GEARING

William L. McGrath and Maurice P. Whitney, Elmira, N. Y., assignors, by mesne assignments, to Bendix Aviation Corporation, South Bend, Ind., a corporation of Delaware Application January 20, 1938, Serial No. 185,872

6 Claims. (Cl. 74—7)

The present invention relates to engine starter gearing and more particularly to a yielding driving connection between the starting motor and a member of an engine to be started.

It is an object of the present invention to provide a novel yielding driving connection for engine starters which is efficient and reliable in operation while being simple and economical in construction.

It is another object to provide such a device which is readily adaptable for use in various installations requiring different operating characteristics.

It is a further object to provide such a device which is variable as to elasticity and torque capacity without the necessity of providing a large supply of component parts having varying characteristics.

Further objects and advantages will be apparent from the following description taken in connection with the accompanying drawing in which.

Figure 1:
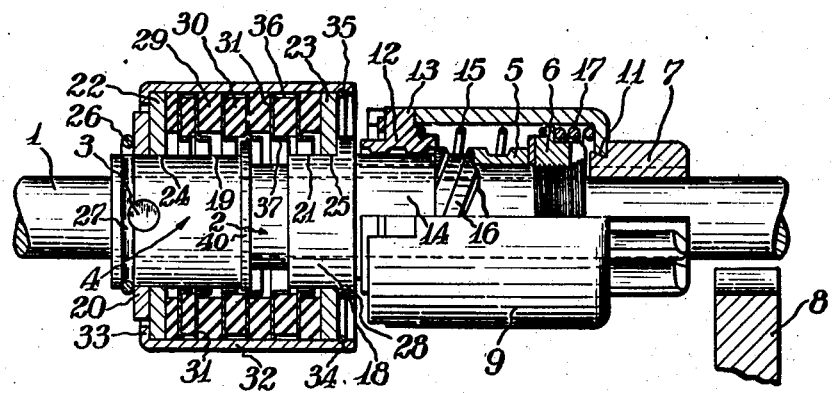
Fig. 1 is a side elevation partly in section of a preferred embodiment of the invention.
Figure 3:
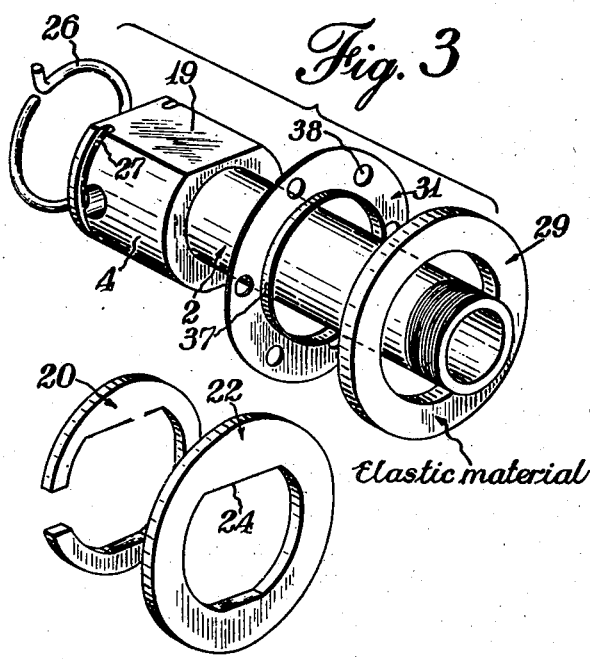
Fig. 3 is a detail in perspective of certain of the component parts of the yielding driving connection shown in disassembled relation.
Figure 2:
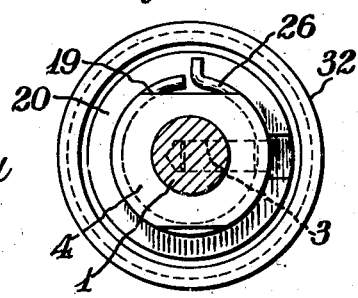
Fig. 2 is an end view from the left in Fig. 1.

According to the present invention, a power shaft 1 which may be the extended armature shaft of a starting motor, not illustrated, has fixed thereon a hollow sleeve 2 by suitable means such as a pin 3 passing through a driving head 4 of non-circular contour formed on the sleeve 2, and into or through the power shaft 1 as indicated in dotted lines in Fig. 2.

A screw shaft 5 is slidably mounted on the sleeve 2, being retained thereon by suitable means such as a stop nut 6 threaded on said sleeve.

A pinion 7 is slidably and non-rotatably mounted on the power shaft 1 for movement into and out of engagement with a member such as a flywheel gear 8 of an engine to be started. Means for actuating the pinion 7 from the screw shaft 5 is provided comprising a barrel 9 fixed to the pinion as indicated at 11 and having a nut 12 anchored thereto as indicated at 13. Nut 12 is normally positioned on a smooth portion 14 of the screw shaft 5 by means of an anti-drift spring 15, but is urged into engagement with the threads 16 of the screw shaft by means of a reentry spring 17. Screw shaft 5 is provided with a driven head 18, and a novel form of yielding driving connection between the driving head 4 of sleeve 2 and the driven head 18 of the screw shaft is provided for transmitting the rotation of the power shaft 1 to the screw shaft to actuate the starting pinion.

As herein illustrated, the driving and driven heads are provided with non-circular contours comprising flattened surfaces 19 on the driving head 4, and 21 on the driven head 18. Annular plates 22 and 23 having non-circular openings 24 and 25 therein conforming to the contours of the driving and driven heads are slidably mounted on said heads respectively. The driving plate 22 is retained on the driving head 4 by suitable means such as a split retaining ring 26 seated in a groove 27 in the driving head, a thrust washer 20, slotted to admit the pin 3, being preferably interposed between the plate and ring. The driven plate 23 is retained on the driven head 18 by shoulders 28 formed by the termination of the flattened surfaces 21 of said driven head. In order to form the rotative connection between the driving and driven plates 22 and 23, a series of rings 29, 30 of elastically compressible material having a high coefficient of friction such as rubber or the like are interposed between said plates, said rings being separated by annular spacers 31 of metal or other suitable material for frictionally engaging said rings.

The rings 29, 30 and spacers 31 are held in initial compressive relation by means of a barrel 32 enclosing said elements and having a flange 33 engaging the driving plate 22, and a split retaining ring 34 seated in a groove 35 in the interior of the barrel and compressively engaging the driven plate 23.

In order to facilitate compression of the coupling formed by the elastic rings 29, 30, the rings 30 are made of smaller diameter than the interior of the barrel whereby an annular space 36 is provided which permits expansion of the rings 30 when placed under compression. Since, when a rubber ring is compressed laterally, the major deformation thereof is radially outward, the relative number of rings 30 used will control the relative elasticity of the coupling in compression and torsion. In other words, if no rings 30 were used, the coupling would be torsionally elastic but would have comparatively little compressive elasticity due to the fact that no room would be provided for outward expansion of the elements of the coupling. On the other hand, if all the rings of the coupling were of the smaller diameter type 30, the coupling would be quite limber as respects compressive forces.

In order to maintain the rings 30 centered with respect to the coupling, the spacing rings 31 are preferably provided with internal flanges 37 formed to engage the inner periphery of said rings.

In the operation of this device, rotation of the power shaft 1 due to energization of the starting motor, is transmitted through the pin 3 to the driving head 4 of sleeve 2, thus causing rotation of the driving plate 22 which is non-rotatably mounted thereon. This rotation is transmitted serially through the rings 29, 30 and spacers 31 to the driven plate 23 due to the initial compression of the coupling, which rotation is transmitted through the driven head 18 to the screw shaft 5 whereby the nut 12 is translated on the screw shaft into engagement with the stop nut 6, thus causing pinion 7 to mesh with the engine flywheel gear 8. When the longitudinal movement of the nut 12 is interrupted by the stop nut 6, the screw shaft 5 threads itself back on the sleeve 2, thus compressing the coupling members and thereby increasing the torque capacity of the coupling. When sufficient torque has been built up to cause rotation of the engine flywheel, cranking of the engine takes place, the transmission of cranking torque being cushioned by the torsional resistance of the coupling and further by the compressive yielding of the coupling under the screw jack action of the screw shaft and nut 12.

It will be readily apparent that by the variation of the proportion of the rings 29 of full diameter to the rings 30 of smaller diameter, and by varying the number of spacers 31 employed, a coupling may be built up having practically any desired characteristics as respects torsional and compressive elasticities.

The torque capacity of the coupling may be increased, if desired, by roughening or forming openings such as the openings 38 in the separators 31 so as to increase the resistance to slippage of the coupling. On the other hand, the maximum torque may be limited by the use of one or more thrust washers 40 to space the driving and driven heads and thereby limit the compression of the yielding coupling.

Although but one form of the invention has been shown and described in detail, it will be understood that other forms are possible and various changes may be made in the design and arrangement of the parts without departing from the spirit of the invention as defined in the claims appended hereto.

What is claimed is:

1. In starter gearing for internal combustion engines, a motor shaft, a pinion movable thereon into and out of engagement with a member of an engine to be started, and means for actuating said pinion including a driving member, a driven member, a plurality of separate relatively displaceable discs of elastically deformable material interposed therebetween, means interposed between the discs for centralizing the discs on the shaft while permitting radial deformation of certain of the discs, and torque-responsive means for compressing the discs and centralizing means between the driving and driven means whereby the discs and centralizing means may yieldably transmit torque between the driving and driven means.

2. In starter gearing for internal combustion engines, a motor shaft, a pinion movable thereon into and out of engagement with a member of an engine to be started, and means for actuating said pinion including a driving member, a driven member, and elastic means for transmitting torque therebetween including a plurality of separate relatively displaceable annular laminae of elastically deformable material having a high coefficient of friction, means for centering the laminae on the shaft while permitting radial expansion of certain of said laminae, means responsive to torque transmitted therethrough for compressing the laminae between the driving and driven members, and spacing means between the driving and driven members for limiting the compression of the laminae to thereby limit the transmission of torque therethrough.

3. In an engine starter, a shaft, an engine driving member mounted thereon, and means for actuating the driving member from the shaft including a plurality of separate relatively displaceable rings which are elastic both in torsion and compression, a barrel member in which the rings are mounted under slight initial compression, and torque-responsive means for compressing the rings in the barrel, certain of said rings having space for radial expansion in the barrel.

4. In an engine starter drive, an engine driving member, means including a screw shaft for moving the driving member into and out of engagement with a member of the engine to be started, means including a compression coupling having a plurality of separate relatively displaceable torsionally elastic rings mounted and connected for frictional transmission of torque to rotate said screw shaft, means for centering said rings on the axis of the screw shaft, and means whereby longitudinal movement of the screw shaft after the driving member has been moved into engagement with the engine member causes said rings to be compressed to increase the torque capacity of the coupling, certain only of said rings being free to extend radially outwardly under such pressure 5. In an engine starter drive, a drive shaft, a pinion slidable thereon into and out of engagement with a member of the engine to be started, and means for actuating the pinion from the drive shaft including a driving member, a driven member, means including a plurality of rings of elastically deformable material frictionally connecting said driving and driven members and serving to cushion the sliding of the pinion, and a barrel enclosing said rings, said barrel preventing radial outward expansion of certain of said rings to control the longitudinal compressibility of the drive.

6. In an engine starter drive, a drive shaft, a pinion slidable thereon into and out of engagement with a member of the engine to be started, and means for actuating the pinion from the drive shaft including a driving member, a driven member, means including a plurality of relatively movable rings of elastically deformable material frictionally connecting said driving and driven members and serving to cushion the sliding of the pinion, a barrel enclosing said rings, certain of said rings fitting the interior of the barrel so as to be prevented from radial outward expansion, other of said rings being free to expand radially outward to provide longitudinal compressibility of the drive, and centering means for said latter rings comprising spacing rings fitting in the barrel and having internal flanges engaging the inner peripheries of said rings.

WILLIAM L. McGRATH.
MAURICE P. WHITNEY.